(12) United States Patent
Guan et al.

(10) Patent No.: US 6,570,650 B1
(45) Date of Patent: May 27, 2003

(54) APPARATUS AND METHODS FOR REDUCING THIN FILM COLOR VARIATION IN OPTICAL INSPECTION OF SEMICONDUCTOR DEVICES AND OTHER SURFACES

(75) Inventors: Yu Guan, San Jose, CA (US); Hong Fu, Fremont, CA (US); Steven R. Lange, Alamo, CA (US)

(73) Assignee: KLA-Tenor Corporation, San Jose, CA (US)

( * ) Notice: Subject to any disclaimer, the term of this patent is extended or adjusted under 35 U.S.C. 154(b) by 0 days.

(21) Appl. No.: 09/948,974

(22) Filed: Sep. 7, 2001

Related U.S. Application Data

(60) Provisional application No. 60/300,088, filed on Jun. 21, 2001.

(51) Int. Cl.[7] ............................................. G01N 21/88
(52) U.S. Cl. .................... 356/237.4; 356/237.1; 356/237.2; 356/237.3; 356/237.5; 250/205; 250/559.26
(58) Field of Search .............................. 356/503, 504, 356/484, 128, 632, 630, 237.1, 237.2–237.5, 456; 250/205, 559.26

(56) References Cited

U.S. PATENT DOCUMENTS

| | | | |
|---|---|---|---|
| 4,909,631 A | * 3/1990 | Tan et al. .................... 356/128 |
| 5,396,080 A | * 3/1995 | Hannotiau et al. ...... 250/559.28 |
| 5,493,401 A | * 2/1996 | Horie et al. ............ 250/559.26 |
| 5,717,490 A | * 2/1998 | Kumar ......................... 356/630 |
| 5,774,222 A | 6/1998 | Maeda et al. ................ 356/394 |
| 6,020,968 A | * 2/2000 | Horie ............................ 356/632 |
| 6,236,459 B1 | * 5/2001 | Negahdaripour et al. ... 356/451 |
| 6,392,756 B1 | * 5/2002 | Li et al. ........................ 356/369 |

* cited by examiner

Primary Examiner—Richard A. Rosenberger
Assistant Examiner—Vincent P. Barth
(74) Attorney, Agent, or Firm—Beyer Weaver & Thomas, LLP; Mary R. Olynick

(57) ABSTRACT

Disclosed are methods and apparatus for designing an optical spectrum of an illumination light beam within an optical inspection system. A set of conditions for inspecting a film on a sample is determined by directing an illumination light beam at the sample is determined. At least a portion of the illumination light beam is reflected off the sample and used to generate an image of at least a portion of the film on the sample. A plurality of peak wavelength values are determined for the optical spectrum of the illumination light beam so as to control color variation in the image of the film portion. The determination of the peak wavelengths is based on the determined set of conditions and a selected thickness range of the film. In one specific embodiment, the color variation is reduced, while in another embodiment the color variation is increased to enhance pattern contrast. An apparatus which implements the designed optical spectrum is also disclosed.

35 Claims, 8 Drawing Sheets

APPARATUS AND METHODS FOR REDUCING THIN FILM COLOR VARIATION IN OPTICAL INSPECTION OF SEMICONDUCTOR DEVICES AND OTHER SURFACES

CROSS-REFERENCE TO RELATED APPLICATION

This application takes priority under U.S.C. 119(e) of U.S. Provisional Application No.: 60/300,088 filed Jun. 21, 2001 entitled, "APPARATUS AND METHODS FOR REDUCING THIN FILM COLOR VARIATION IN OPTICAL INSPECTION OF SEMICONDUCTOR DEVICES AND OTHER SURFACES" by Yu Guan, Hong Fu, and Steven R. Lange which is incorporated by reference in its entirety for all purposes.

BACKGROUND OF THE INVENTION

This invention relates to a method and apparatus for evaluating surface features of a substrate such as wafers, reticles, photomasks, and the like (hereafter referred to generally as substrates). More particularly, the present invention relates to an optical inspection system that can produce images of such substrates with minimum color variation.

Integrated circuits are made by photolithographic processes, which use photomasks or reticles and an associated light source to project a circuit image onto a silicon wafer. The presence of defects on the surfaces of the wafers is highly undesirable and adversely affects the resulting circuits. The defects can be due to, but not limited to, a portion of the pattern being absent from an area where it is intended to be present, a portion of the pattern being present in an area where it is not intended to be, chemical stains or residues from the wafer manufacturing processes, particulate contaminates such as dust, resist flakes, skin flakes, erosion of the photolithographic pattern due to electrostatic discharge, artifacts in the wafer such as pits, scratches, and striations in the substrate or pattern layer. Since it is inevitable that defects will occur, these defects have to be found and repaired prior to use. Blank substrates can also be inspected for defects prior to patterning.

Defects also occur in the device itself as the result of reticle defects and/or processing defects, for example. These defects may take the form of particles randomly localized on the surface, scratches, process variations such as under etching, etc. These and similar problems often arise when processing equipment malfunctions or degrades in performance over time. Examples of such equipment include plasma etchers, deposition systems, chemical mechanical planarization systems, reticle processing, and photolithography equipment. Obviously, a manufacturer needs to know when the process equipment ceases to function in an acceptable manner.

Many optical and electronic inspection systems and inspection techniques exist for identifying and classifying defects such as those on a partially or fully fabricated integrated circuit or a reticle. Such techniques and apparatus are well known in the art and are embodied in various commercial products such as many of those available from KLA-Tencor Corporation of San Jose, Calif. The simplest of these techniques involves a casual visual inspection by a technician of a wafer held in white light and examined to determine whether there is any variation in the appearance of the various dies fabricated on the wafer. Ideally, each die should have the same appearance when moved about under a white light. If there is any variation in the appearance of one or more of the dies on the wafer, then it can be assumed the dies are not structurally identical and some problem exists.

A related technique involves performing optical microscopy (e.g., bright field or dark field imaging) on the various dice of a wafer. Two images are formed from light reflected from two dice, and the images are compared by the microscopy tool. Any significant variation in the image of the dices indicates that there is a defect in at least one of the dice. Unfortunately, the intensity of light that is reflected from a wafer is affected by numerous inherent factors of the material being inspected. A typically inspected material is a dielectric (e.g., $SiO_2$) thin film deposited over a metal or silicon substrate that has unintended thickness variation which occurs during fabrication. The reflectance of the wafer changes with the $SiO_2$ thickness as a result of optical interference. This is seen in an image taken from that area of the wafer as gray level variation and is referred to as "color variation." Since bright field inspection systems use images to find defects, such color variation is a nuisance source because it can cause false detection of defects. Color variation becomes more severe for $SiO_2$ on Si or $SiO_2$ on Cu interfaces, as compared with $SiO_2$ on Al interface.

One conventional technique for reducing color variation is broadband illumination. The illumination beams are typically configured to have a relatively large wavelength range, i.e. bandwidth, in order to reduce coherence length. An inspection system will typically include a broadband illumination source capable of producing a 70 to 80 nm wide spectrum in the near ultraviolet (near UV) region or a about 150 nm wide spectrum in the visible wavelength region. Such illumination spectra results in a significant reduction in interference induced color variation for a film thickness greater than 1 $\mu$m.

Although current broadband inspection systems work well for film thicknesses over 1 $\mu$m, the wavelength range of the broadband illumination beam would have to be significantly extended (e.g., by a factor of two) to achieve sufficient reductions in color variation for film thickness less than 1 $\mu$m. This bandwidth extension may not be practical on inspection machines which are designed to operate in their original wavelength ranges. These conventional broadband inspection systems result in color variation that is still excessively high (e.g., about 25% for 0.4 to 1.0 $\mu$m thick $SiO_2$ film on Si or copper which is becoming increasingly common) for thin films and results in many nuisance defects being detected as "real" defects. That is, the illumination source of an inspection machine may be limited to a smaller wavelength range than is required for achieving a sufficient reduction in color variation for thin films using conventional broadband illumination techniques.

Accordingly, there is a need for improved mechanisms for controlling color variation for thin films during optical inspection of a sample, such as a semiconductor wafer without extending the existing wavelength range of illumination sources available in inspection systems.

SUMMARY OF THE INVENTION

Accordingly, mechanisms are provided for controlling the spectrum of an illumination light beam of an optical inspection system so as to control color variation on an image of a film. The inspection system may thereafter use the controlled beam to generate an image of a film on a sample, where color variation in the image of the film is either suppressed or increased for a selected thickness or range of thickness value(s) of the film, as compared with using an uncontrolled illumination beam. By way of example implementations, the spectrum of the illumination beam is optimized for color variation reduction or pattern contrast (contrast between the circuit patterns and their neighboring areas) enhancement after the beam originates from a light source of the inspection system and before it reaches the sample or after at least a portion of the beam reflects off sample and before it hits an imaging device of the system. The controlled spectrum of the illumination beam has the same wavelength range as the uncontrolled spectrum. That is, the existing spectrum of the illumination beam used for the inspection system is controlled to minimize or maximize color variation of the image for particular thickness value(s) of the film without extending its wavelength range.

In one embodiment, a method of designing an optical spectrum of an illumination light beam within an optical inspection system is disclosed. A set of conditions for inspecting a film on a sample by directing an illumination light beam at the sample is determined. At least a portion of the illumination light beam is reflected off the sample and used to generate an image of at least a portion of the film on the sample. A plurality of peak wavelength values are determined for the optical spectrum of the illumination light beam so as to control color variation in the image of the film portion. The determination of the peak wavelengths is based on the determined set of conditions and a selected thickness range of the film. The determined peak wavelengths are wavelengths within the spectrum that have a maximum intensity value as compared to neighboring wavelengths. The determined peak wavelengths are also within a wavelength range of a light source of the illumination beam. In one specific embodiment, the color variation is reduced, while in another embodiment the color variation is increased to enhance pattern contrast.

In a specific implementation, the conditions include a wavelength range, a material type of the sample, an objective numerical aperture of the inspection system, and a detected spectral signal response of the inspection system. In a further implementation, a width and a height associated with each determined peak wavelength are determined. In one embodiment, the heights associated with the peak wavelengths are determined through apodization and a correction factor is applied to each height to compensate for wavelength dependence of color variation.

In another aspect, the invention pertains to a computer system operable to design an optical spectrum of an illumination light beam within an optical inspection system. The computer system includes one or more processors and one or more memory. At least one of the processors and memory are adapted to perform one or more of the above described methods. In yet another aspect, the invention pertains to a computer program product for designing an optical spectrum of an illumination light beam within an optical inspection system. The computer program product includes at least one computer readable medium and computer program instructions stored within the at least one computer readable product configured to cause a combining device to perform one or more of the above described methods.

In an alternative embodiment, an inspection system for analyzing a sample is disclosed. The system includes a light source for generating a illumination light beam, a first optics arrangement for directing the illumination beam to a film on a sample, and a second optics arrangement for receiving a portion of the illumination beam that reflected off the sample to thereby generate an image of the film. The inspection system further includes a spectrum controller for controlling a spectrum of the illumination beam so that color variation of the image is controlled (e.g., enhanced or suppressed). The controlled spectrum includes a plurality of peak wavelengths selected to control color variation for a particular thickness value of the film and a particular configuration of the inspection system. The peak wavelengths are between a wavelength range of a light source of the illumination beam. The determined peak wavelengths are also wavelengths within the spectrum that have a maximum intensity value as compared to neighboring wavelengths.

In one specific implementation, the particular inspection configuration includes a wavelength range, an objective numerical aperture of the inspection system, and a configuration of the first and second optics arrangements. In another embodiment, a plurality of heights associated with the peak wavelengths have a generally apodized distribution and compensate for a wavelength dependence of color variation. In yet another implementation, a plurality of widths associated with the peak wavelengths are selected to control color variation.

In a specific implementation, the spectrum controller is a filter in an optical path of the optical illumination beam, and the filter is positionable or positioned in an optical path of the illumination beam between the light source and the sample. In another embodiment, the filter is positionable or positioned in an optical path of the reflected illumination beam between the sample and an imaging device of the inspection system. In yet another embodiment, the filter is integrated within the first and/or second optics arrangement. In an alternative embodiment, the filter is an interference spectrum filter or a spatial light modulator combined with a wavelength dispersion device.

In one implementation of the inspection system, the light source is configured to generate a plurality of laser or narrow band beams, and the spectrum controller is configured to combine the laser or narrow band beams and adjust an intensity level of each of the plurality of beams so as to substantially produce the controlled spectrum of the illumination beam having the plurality of peak wavelengths with associated heights that have a generally apodized distribution and compensate for a wavelength dependence of color variation.

In another specific implementation of the inspection system, the light source is configured to generate a laser or narrow band beam, and the spectrum controller contains a Raman scattering material positioned or positionable to generate a plurality of peak wavelengths, and the spectrum controller is configured to adjust an intensity level associated with each of the plurality of peak wavelengths so as to substantially produce the controlled spectrum of the illumination beam having the plurality of peak wavelengths associated with heights that have a generally apodized distribution and compensate for a wavelength dependence of color variation.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
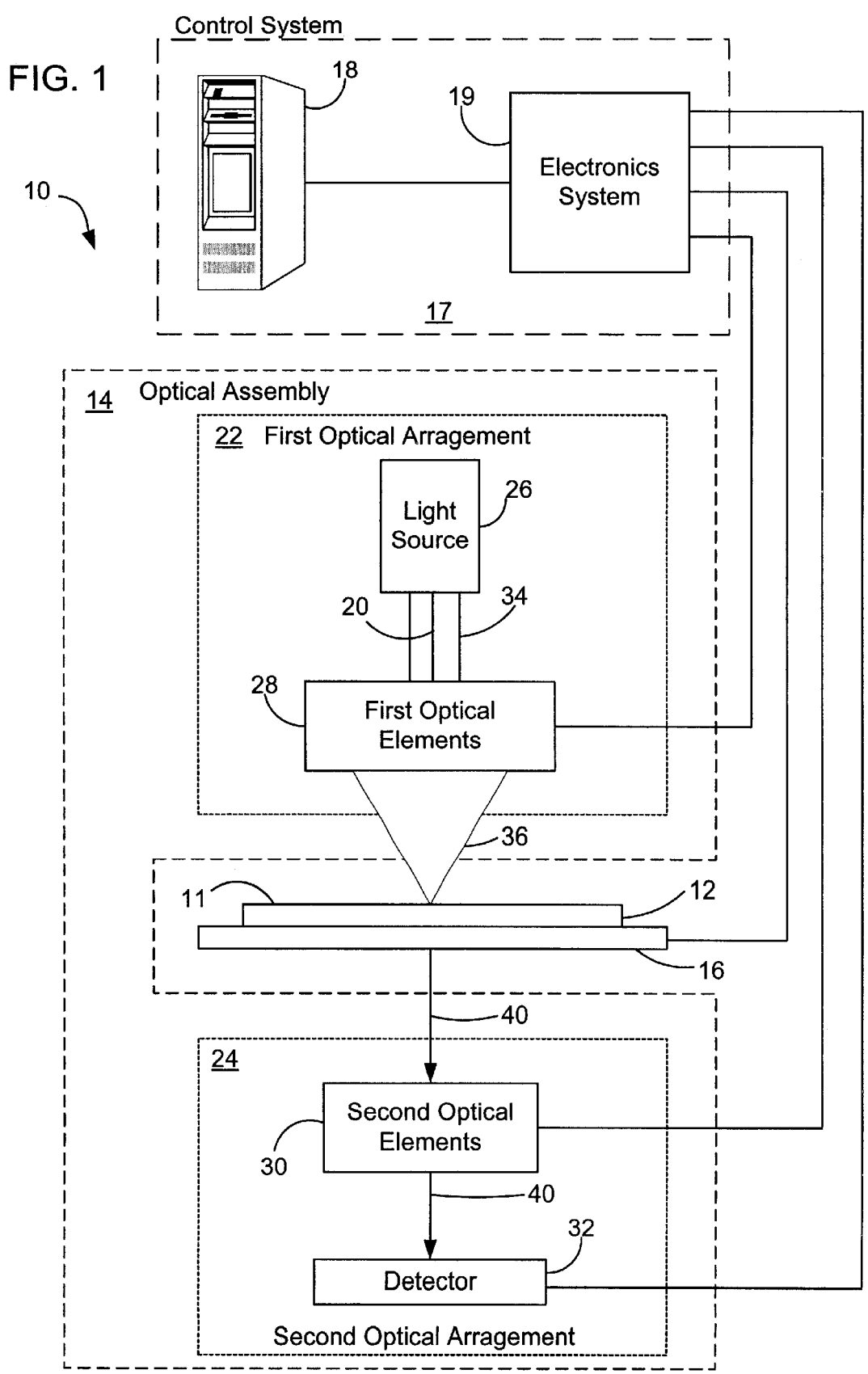
FIG. 1 is a simplified block diagram of an optical inspection system that may be used to implement embodiments of the present invention.

FIG. 1 is a simplified block diagram of an optical inspection system 10 that may be used to implement embodiments of the present invention. The optical inspection system 10 is arranged for inspecting a surface 11 of a substrate 12. The dimensions of various components are exaggerated to better illustrate the optical components of this embodiment. As shown, the optical inspection system 10 includes an optical assembly 14, a stage 16, and a control system 17. The optical assembly 14 generally includes at least a first optical arrangement 22 and a second optical arrangement 24. In general terms, the first optical arrangement 22 generates a illumination beam incident on the substrate, and the second optical arrangement 24 detects a illumination beam emanating from the sample as a result of the incident illumination beam. The first and second optical arrangement may be arranged in suitable manner in relation to each other. For example, the second optical arrangement 24 and the first optical arrangement 22 may both be arranged over the substrate surface 11 so that reflected illumination beam resulting from incident illumination beam generated by the first optical arrangement 22 may be detected by the second optical arrangement 24. Several embodiments of the optical assembly 14 altered to implement the present invention are described further below with reference to FIG. 9.

In the illustrated embodiment, the first optical arrangement 22 is arranged for generating an illumination spot (not shown) on the surface 11 of the substrate 12. On the other hand, the second optical arrangement 24 is arranged for collecting reflected light that is produced by the illumination spot on the surface 11 of the substrate 12.

To elaborate further, the first optical arrangement 22 includes at least a light source 26 for emitting a light beam 34 and a first set of optical elements 28. The first set of optical elements 28 may be arranged to provide one or more optical capabilities including, but not limited to, directing the light beam 34 towards beam splitter 37 and through objective 38 to intersect with the surface 11 of the substrate 12. A portion of the incident beam 34 is reflected by beam splitter 37 and becomes incident beam 36 which is focused by objective 38 to a illumination spot (not shown in FIG. 1) on the surface 11 of the substrate 12.

Furthermore, the second optical arrangement 24 includes at least a second set of optical elements 30 and an imaging device 32. The second set of optical elements 30 are in the path of a collected light beam 40, which is formed after the incident light beam 36 intersect with the surface 11 of the substrate 12. The collected light beam 40 may result from reflected light beam 41 that is reflected off the surface 11 of the substrate 12. A portion of the reflected beam 41 passes by beam splitter 37 and becomes collected beam 40. The second set of optical elements 30 are adapted for collecting the collected light beam 40 and for forming an image of a portion of surface 11 of substrate 12 on the imaging device 32. The imaging device 32 is arranged for detecting the light intensity distribution of the collected light beam 40, and more particularly for detecting distribution in the intensity of light caused by the intersection of the incident light beam with the substrate. The imaging device 32 is arranged for detecting the light intensity distribution of the image and for generating signals based on the detected light.

With regards to the stage 16, the stage 16 is arranged for moving the substrate 12 within a single plane (e.g., x & y directions) and relative to incident beam 36, so that all or any selected part of the substrate surface 11 may be inspected by the illumination spot.

The control system 17 generally includes a control computer 18 and an electronic subsystem 19. Although not shown, the control system 17 may also include a keyboard for accepting operator inputs, a monitor for providing visual displays of the inspected substrate (e.g., defects), a database for storing reference information, and a recorder for recording the location of defects. As shown, the control computer 18 is coupled to the electronic subsystem 19. The electronic subsystem 19 is coupled to various components of the optical inspection system 10, and more particularly to the stage 16 and the optical assembly 14 including the first optical arrangement 22 and the second optical arrangement 24.

The control computer 18 may be arranged to act as an operator console and master controller of the system 10. By way of example, commands may be issued to and status may be monitored from all other subsystems so as to facilitate completion of operator assigned tasks. Additionally, the electronics subsystem 19 may also be configured to interpret and execute the commands issued by control computer 18. The configuration may include capabilities for, but not limited to, digitizing the input from imaging devices, compensating these readings for variations in the incident light intensity, constructing a virtual image of the substrate surface based on the detected signals, detecting defects in the image and transferring the defect data to the control computer 18, accumulating the output of the interferometers used to track the stage 16, providing the drive for linear motors that move the stage 16 or components of the optical assembly 14, and monitoring sensors which indicate status. Control systems and stages are well known in the art and for the sake of brevity will not be discussed in greater detail. A representative stage, as well as a representative controller, may be found in U.S. Pat. No. 5,563,702, which is herein incorporated by reference. It should be understood, however, that this is not a limitation and that other suitable stages and control systems may be used.

In most of the defect detection operations a comparison is made between two images. By way of example, the comparison may be implemented by the electronic subsystem 19 of FIG. 1. Broadly speaking, the imaging device 32 generates images, which are based on the measured light intensity distribution, and sends them to the electronic subsystem 19. The electronic subsystem 19, after receiving the images, compares the target images with reference images, which are either stored in a database or determined in a current or previous measurement.

In die-to-die inspection mode, two areas of the substrate having identical features are compared to each other and any substantial discrepancy is flagged as a defect. In the die-to-database inspection mode, a defect is detected by comparing the die under test with corresponding graphics information obtained from a computer aided database system from which the die was derived.

In general terms, the present invention provides mechanisms for controlling the spectrum of the illumination light beam in an inspection system so that color variation in images taken with such inspection system are controlled. By way of examples, the color variation may be reduced or increased depending upon the particular application. The spectrum may be controlled by altering the spectrum of the illumination light beam emitted from an existing light source within an existing inspection system or by constructing an optimized spectrum from one or more light sources. In either case, the optimized spectrum has the same wavelength range as the inspection system's existing light source.

Figure 2A:
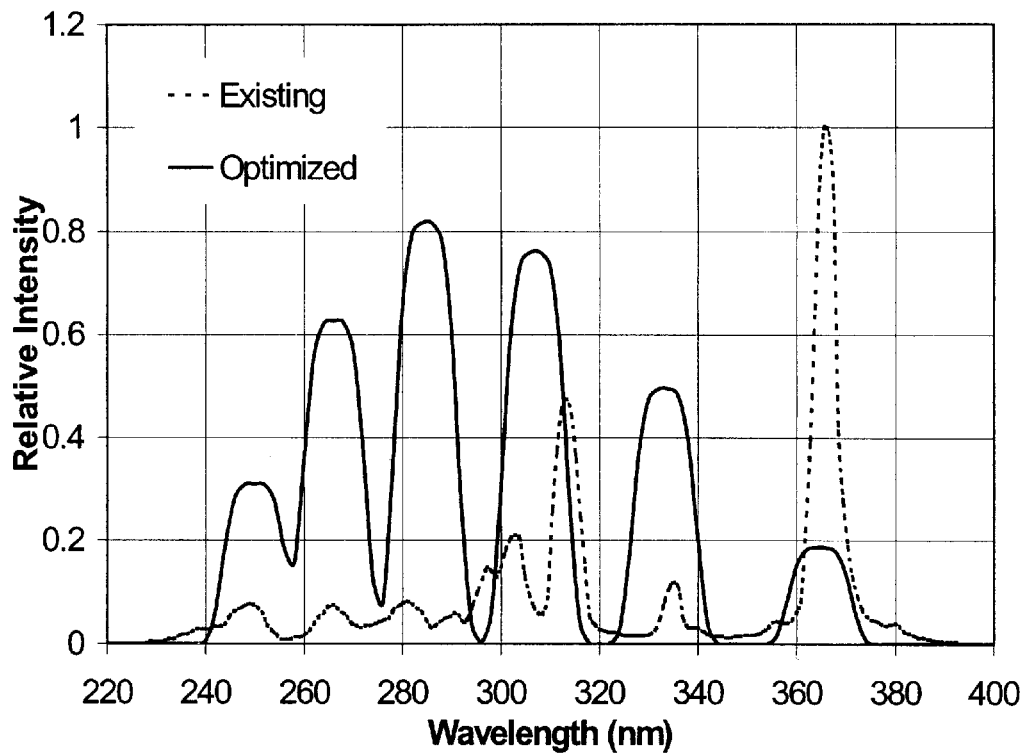
FIG. 2A is a graph illustrating an existing spectrum and an optimized spectrum in accordance with one embodiment of the present invention.

FIG. 2A is a graph illustrating an existing spectrum and an optimized spectrum in accordance with one embodiment of the present invention. In this illustrated example, the optimized spectrum represents an optimization of alteration of the existing spectrum. Relative intensity is plotted along the Y axis, and wavelength (in units of nanometers) is plotted along the X axis. As shown, the optimized spectrum has a plurality of peak wavelengths that are distributed in a roughly Gaussian shape with the peaks at longer wavelengths having a shorter height than the peaks at shorter wavelengths. The term "peak wavelengths" refer to regions of the spectrum that have a maximum intensity value as compared to that at the neighboring wavelengths. As explained further below, this particular configuration of peak wavelengths and their associated heights and widths are optimized to control color variation on an image of the sample at a particular film thickness or range of thickness values.

Figure 2B:
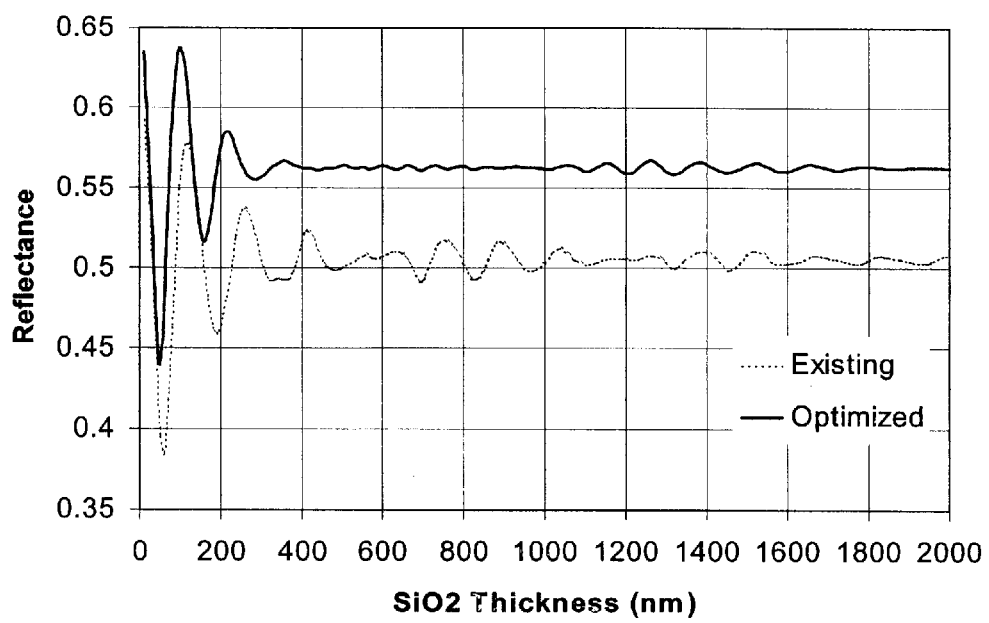
FIG. 2B is a graph illustrating reflectance variation from a sample that results from the existing spectrum and the optimized spectrum of FIG. 2A in accordance with one embodiment of the present invention.

FIG. 2B is a graph illustrating reflectance variation from a sample that results from the existing spectrum and the optimized spectrum of FIG. 2A in accordance with one embodiment of the present invention. In this illustrated embodiment, the optimized spectrum is designed to achieve a minimized color variation level for a particular thickness (d) range, as compared to the existing spectrum. As shown, the optimized spectrum produces substantially less reflection (R) variation for thickness d between 400 and 1000 nm, as opposed to the existing spectrum. Since the signal detected by the imaging device on the inspection system (eg., the gray levels on the time delay integration sensor, or TDI) is proportional to the reflectance of the sample, reflectance variation is seen as gray level variation (also called color variation) in the image. Therefore, minimizing color variation is equivalent to minimizing R vs. d variation. Likewise, enhancing pattern contrast is accomplished by increasing R difference at two particular d's or over two different materials.

It appears that substantial color reduction may be achieved by optimizing an existing spectrum to contain a plurality of peak wavelengths, where the peak wavelengths and their associated heights and widths are selected to reduce color variation for a particular range of film thickness. The following table contains simulation results for existing spectra that are optimized to reduce color in a particular film thickness range for different inspection systems available from KLA-Tencor of San Jose, Calif.:

| System Model | 2138 or 2139 | 2350 | 2370 | 2370 |
| --- | --- | --- | --- | --- |
| Film Thickness ($\mu$m) | 0.4–1.0 | 0.4–1.0 | 0.2–0.4 | 0.4–1.0 |
| Original Reflectance variation | 25% | 23% | 14% | 7% |
| Optimized Reflectance variation | 8% | 5% | 3% | 1% |
| Improvement | 70% | 80% | 80% | 85% |

Figure 3:
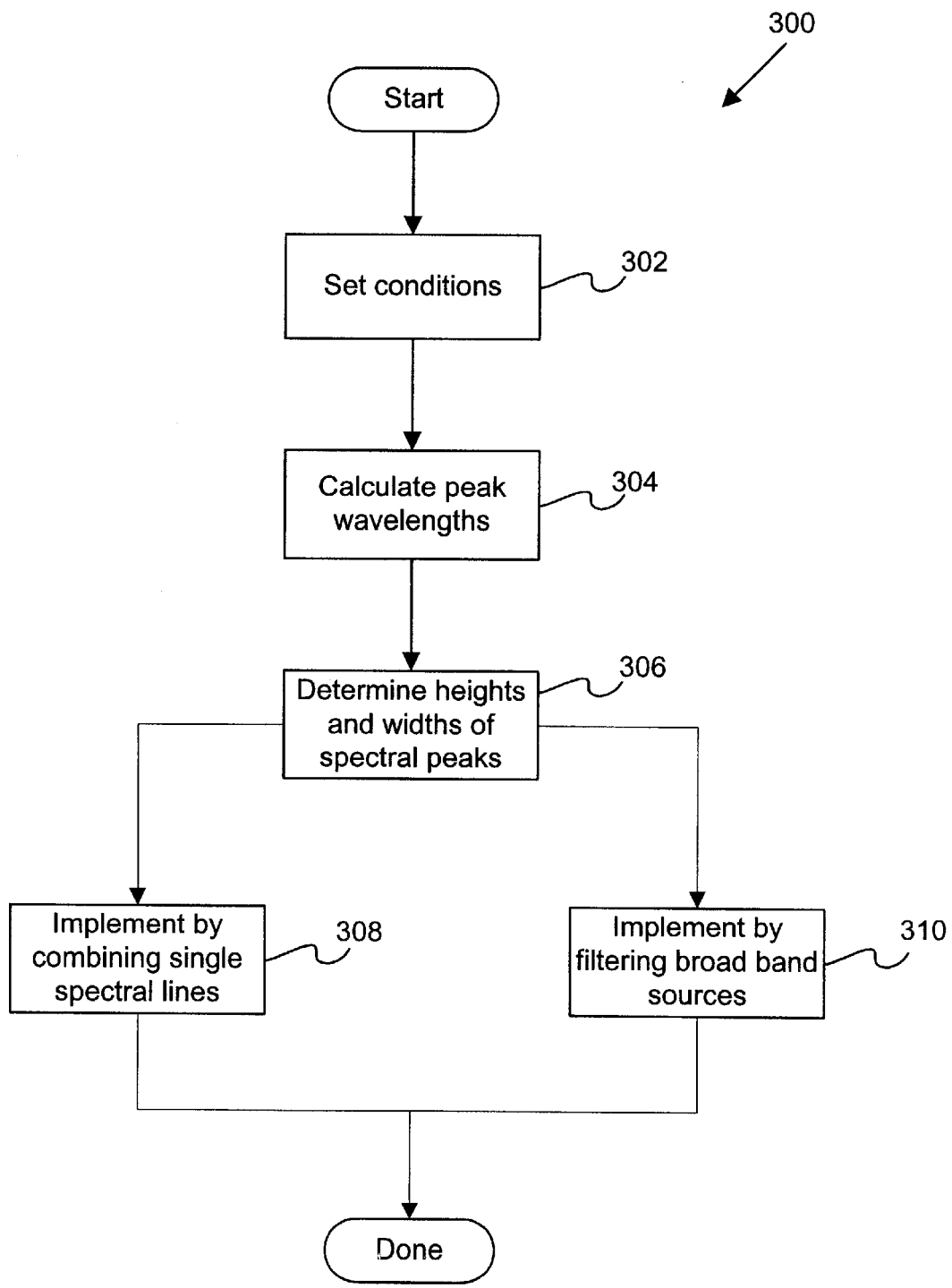
FIG. 3 is a flowchart illustrating a procedure for designing an optimized spectrum for controlling color variation in accordance with one embodiment of the present invention.

Any suitable mechanism may be used for designing and implementing an optimized spectrum for controlling color variation for one or more specified film thickness values and a particular inspection system without extending the wavelength range of the existing illumination light source of the particular inspection system. FIG. 3 is a flowchart illustrating a procedure 300 for designing an optimized spectrum for controlling color variation in accordance with one embodiment of the present invention. Initially, conditions are set in operation 302. The conditions generally contribute to color variation. In the illustrated embodiment, the conditions include the numerical aperture of the inspection system, the particular configuration and operating parameters of the inspections system which affect color variation (e.g., optics configuration and wavelength range of the illumination source), and the composition of materials used on the sample (composition of one or more films and underlying substrate).

A plurality of peak wavelengths are then calculated in operation 304. Heights and widths associated with the peak wavelengths are then determined in operation 306. In general terms, the wavelengths and heights and widths associated with the peak wavelengths are determined so that color variation is controlled to a desired level. After the spectrum is designed in operation 302 through 306, the spectrum may be implemented in any suitable manner. In general terms, the optimized spectrum may be implemented by filtering broadband sources in operation 310 or by combining single spectrum lines in operation 308. Several implementations of the optimized spectrum are described further below with reference to FIG. 9.

The peak wavelengths locations may be calculated in any suitable manner for controlling color variation. For a film with refractive index n and from a particular inspection system having an objective with numerical aperture NA, all available peak wavelengths ($\lambda_q$'s) can be calculated from the following equation (1) for any selected film thickness d, at which the color variation is to be minimized:

$$\lambda_q = \frac{4nd \int_0^{\theta_{fm}} f(\theta_f)\cos\theta_f \sin\theta_f \, d\theta_f}{q \int_0^{\theta_{fm}} \sin\theta_f \, d\theta_f} \quad (1)$$

with q being an integer such that $\lambda_{min} < \lambda_q < \lambda_{max}$, where $\lambda_{min}$ and $\lambda_{max}$ are the minimum wavelength and maximum wavelength, respectively, obtainable from the particular inspection system's illumination source, and $\theta_f$ being the angle of refraction inside the film. The maximum value of $\theta_f$ denoted by $\theta_{fm}$ is obtainable from the objective numerical aperture (NA) of the inspection system using $\theta_{fm} = \sin^{-1}(NA/n)$. The function $f(\theta_f)$ describes the angular intensity distribution of the illumination light in the film.

If the illumination light intensity is angularly uniform within the numerical aperture (NA) of the objective, then $f(\theta_f)=1$ for $0 \leq \theta_f \leq \theta_{fm}$ and $\lambda_q$'s can be explicitly calculated using:

$$\lambda_q = \frac{2d(NA)^2}{qn\left[1 - \sqrt{1 - \left(\frac{NA}{n}\right)^2}\right]} \quad (2)$$

For example, the wavelength range of the 2370 system available from KLA-Tencor of San Jose, Calif. is from 230 nm to 390 nm. If it is preferred that color variation be minimized for a film thickness d near 350 nm, it follows from equation (2) that four peak wavelengths, $\lambda_8=236$ nm, $\lambda_7=266$ nm, $\lambda_6=307$ nm, and $\lambda_5=365$ nm, can be found within this range for a numerical aperture of 0.9.

Figure 4:
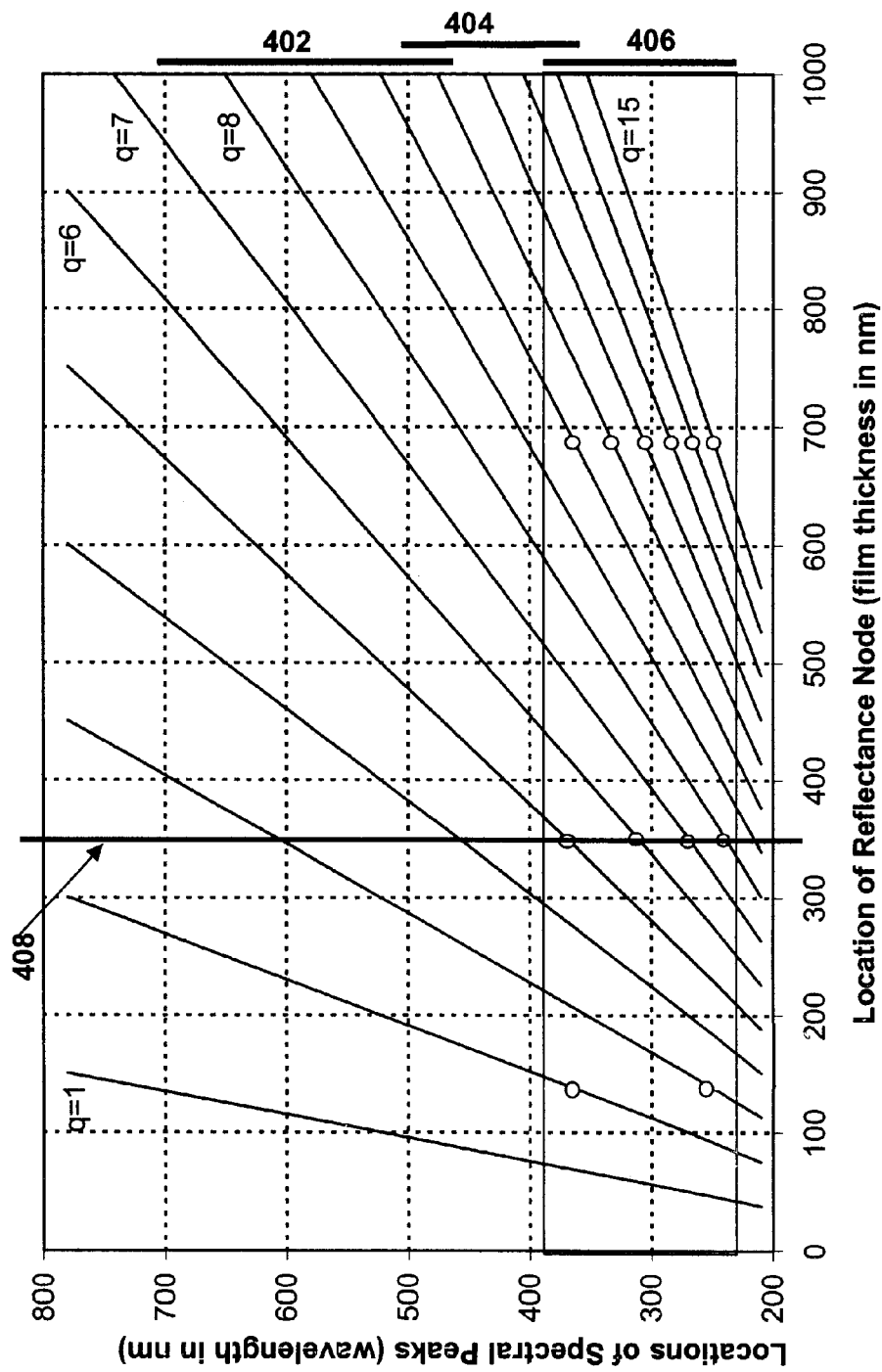
FIG. 4 is a graph of a plurality of peak wavelength locations as a function of film thickness as illustrated in accordance with one embodiment of the present invention.

By way of example, equation (2) may be visually represented by a graph, as shown in FIG. 4, for $SiO_2$ film with NA=0.9 illumination. As shown, a plurality of peak wavelength locations are plotted as a function of the film thickness at which the color variation is to be minimized, in accordance with one embodiment of the present invention. These plots may then be utilized to determine peak wavelengths for a particular film thickness or range of film thickness and a particular available wavelength range. By way of example, for a film thickness of 350 nm, a vertical line 408 may be drawn at a 350 thickness value. The vertical line 408 will intersect with two or more peak wavelengths. Some or all of these peak wavelengths may be selected for color variation control. However, as the number of selected peaks increases, the percentage change of color variation (i.e., reduction or enhancement) increases. As shown, four peak wavelengths are selected for a film thickness of 350 nm. The number of selected peak wavelengths may be necessarily limited by the wavelength range of the illumination source of a particular inspection system. As shown, the available wavelength ranges for three different inspection systems 402, 404, and 406 are indicated on FIG. 4. Four peak wavelengths are available for system 406 for a film thickness of 350 nm.

Figure 5:
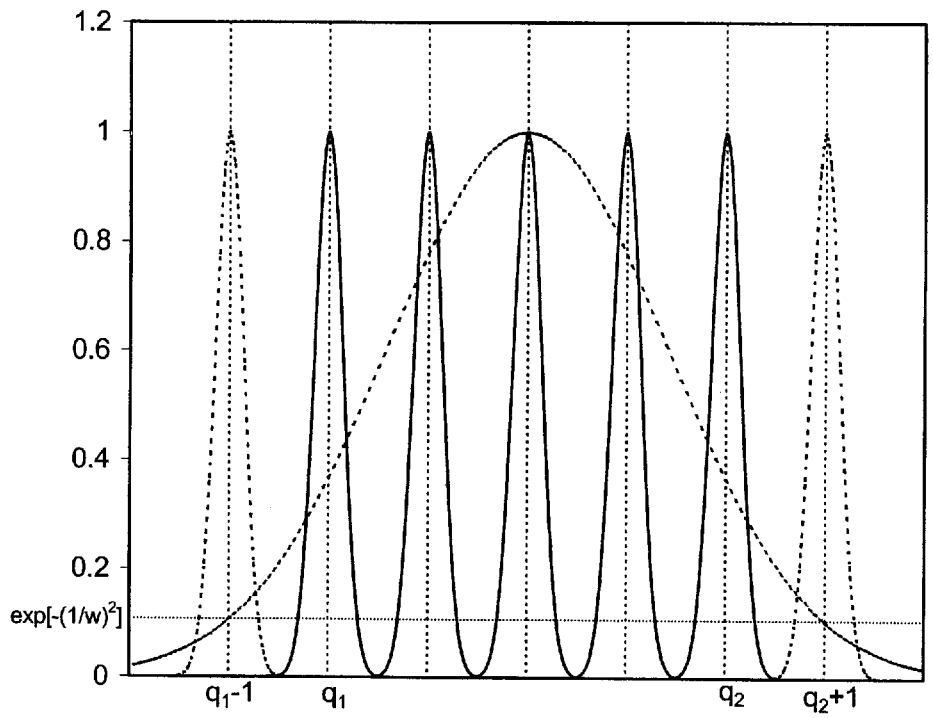
FIG. 5 illustrated an apodization technique used to determine the wavelength peak heights in accordance with one embodiment of the present invention.

The intensity levels or heights associated with the peak wavelengths are then varied so as to optimally control color variation. In one specific implementation, apodization is used to determine the heights as illustrated in FIG. 5. The Gaussian window function can be written as:

$$g(q) = \exp\left\{-\left[\frac{2q - q_{min} - q_{max}}{(q_{max} - q_{min} + 2)w}\right]^2\right\} \quad (3)$$

where q is the index of each spectrum peak, $q_{min}$ and $q_{max}$ correspond to the minimum and maximum values of the wavelength range of the inspection system, respectively, and w is the width of the envelope curve. The height of each spectrum peak q is multiplied by g(q). The width w is chosen such that the height of the two peaks just beyond the wavelength range is negligible. These two peaks have indices $q_{min}-1$ and $q_{max}+1$. According to equation (3), $g(q_{min}-1)=g(q_{max}+1)=\exp[-(1/w)^2]$. For instance, if the height of these two peaks is desired to be less than 2% of the central peak height, then $w \approx 0.55$. Smaller w makes the nodes, for example, on the R vs. d curve cleaner and narrower and eventually disappear. On the other hand, larger w results in noisier and broader nodes. The final value may need to be fine adjusted for each individual set of conditions (e.g., system configuration, film configuration and material type).

Figure 6:
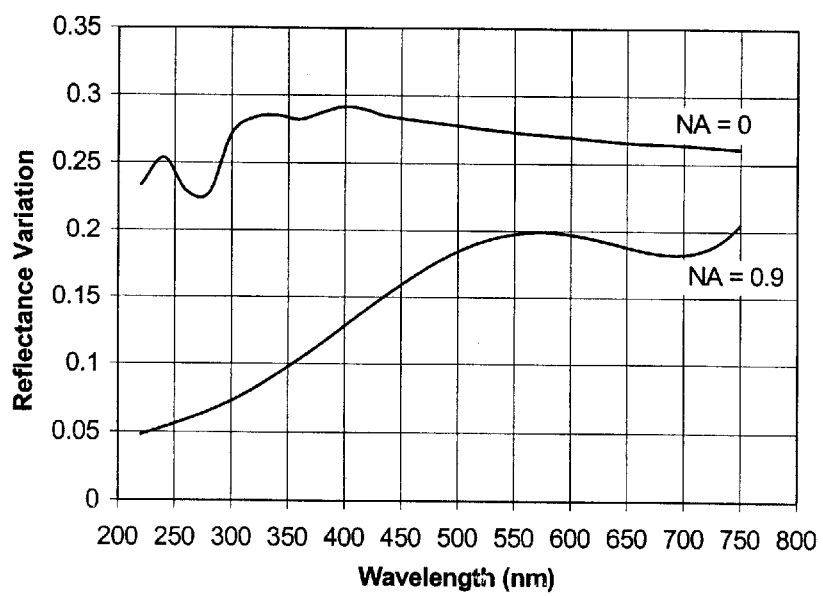
FIG. 6 illustrates color variation's dependence on wavelength for two settings of numerical apertures of an objective of a particular inspection system.
Figure 7:
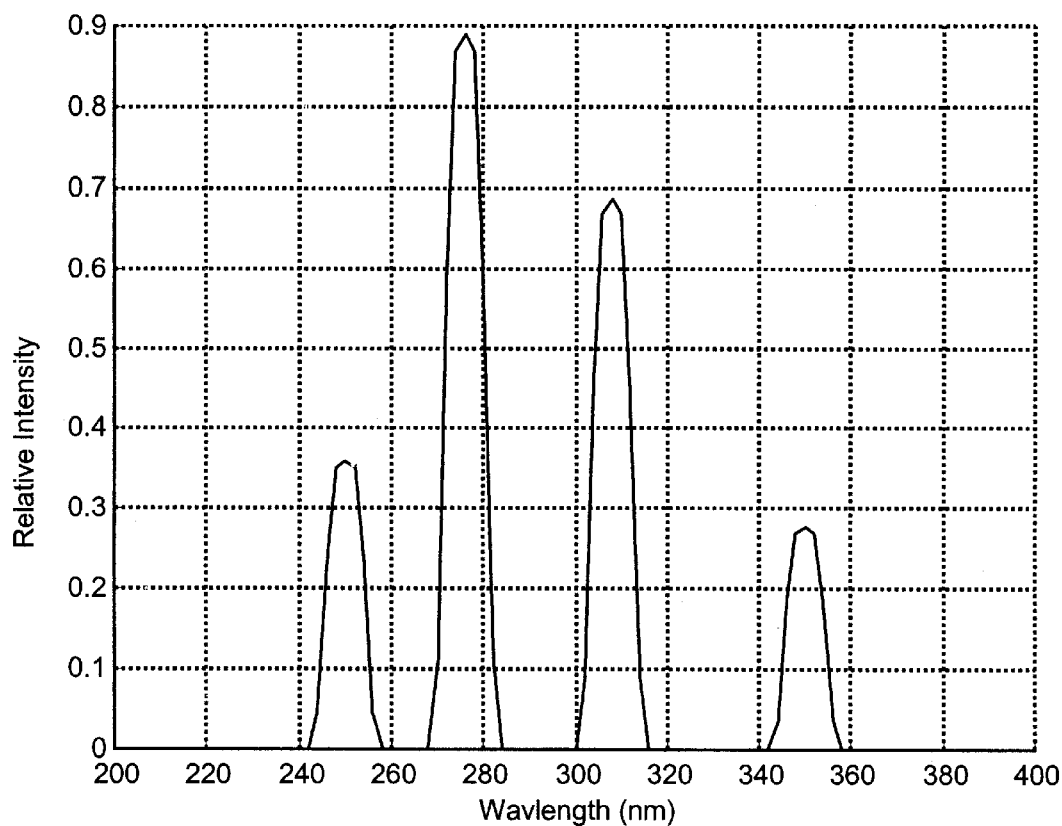
FIG. 7 illustrates a plurality of peak wavelengths whose associated heights have been adjusted in roughly a Gaussian shape and to compensate for color variations dependence on wavelength so as to minimize color variation in accordance with one embodiment of the present invention.

The heights associated with the selected peak wavelengths may then be adjusted to compensate for color variation's dependence on wavelength. By way of example, longer wavelengths tend to cause greater color variation for $SiO_2$ films on Si substrate. Accordingly, if one wishes to minimize color variation, then the peak wavelengths at longer wavelengths have a lower associated height than that at shorter wavelengths. FIG. 6 illustrates color variation's dependence on wavelength for two settings of numerical apertures of an objective of a particular inspection system. FIG. 7 illustrates a plurality of peak wavelengths whose associated heights have been adjusted in roughly a Gaussian shape and to compensate for color variations dependence on wavelength so as to minimize color variation in accordance with one embodiment of the present invention.

The widths associated with the peak wavelengths may be adjusted in any suitable manner. For example, the widths may be uniformly changed or individually changed so that color variation is calculated to be less than a desired amount (e.g., percentage amount reduction for color variation reduction) or greater than a desired amount (e.g., percentage amount increase for pattern contrast enhancement). In general terms, a first set of widths are selected for the plurality of peak wavelengths. Color variation as a result of the optimized spectrum is then simulated. It is then determined whether the simulated color variation is within the desired range for the selected film thickness range. The widths continue to be adjusted and the color variation simulated until the color variation is within the desired range. For instance, a predetermined color variation percentage may be selected as a maximum or minimum criterion. For color minimization, the widths are adjusted until the R variation percentage is less than or equal to the maximum criterion. For pattern contrast enhancement, the widths are adjusted until the R variation percentage for two particular film thickness (d) values or two particular film materials is greater than or equal to the minimum criterion. Alternatively, the color variation minimum and maximum criterion may be limited to values that are achievable in the particular application. In this case, the color variation may be minimized or the contrast between features is maximized as much as possible.

Figure 8:
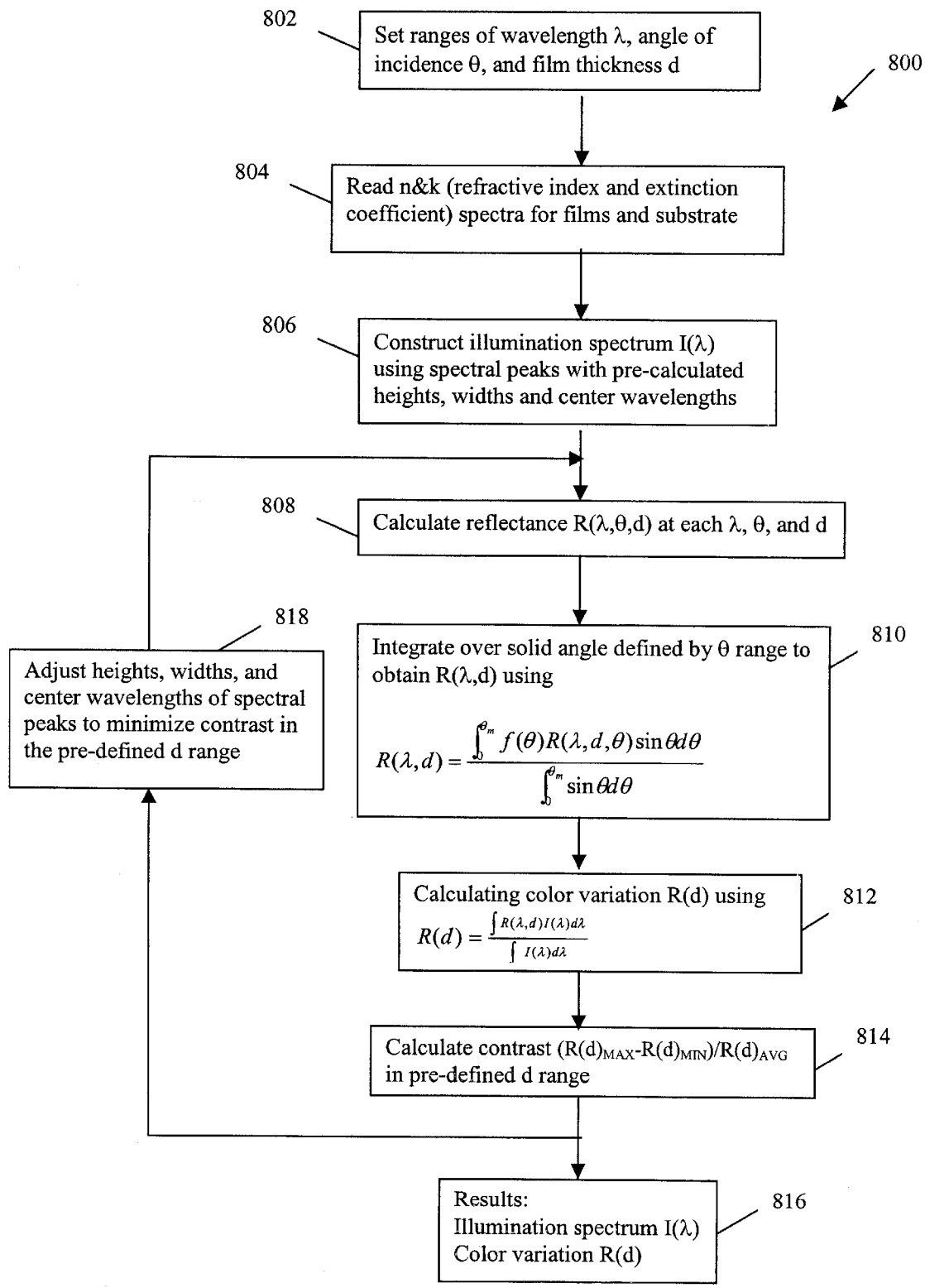
FIG. 8 is a flowchart illustrating a procedure for simulating color variation in accordance with one embodiment of the present invention.

FIG. 8 is a flowchart illustrating a procedure 800 for simulating color variation in accordance with one embodiment of the present invention. Initially, a plurality of conditions are set in operation 802. As shown, ranges of available wavelengths, angle of incidence (θ) of the illumination beam, and film thickness (d) are set in operation 802. The refractive index (n) and extinction co-efficient (k) spectrum for the particular films and substrate used are then read, for example, from a table in operation 804. An illumination spectrum I(λ) is then constructed using the spectrum peaks with the pre-calculated heights, widths, and center wavelengths in operation 806. The reflectance R (λ, θ, d) is then calculated at each wavelength λ, angle θ and thickness d in operation 808. The reflectance R(λ, d) is then obtained by integrating over a solid angle defined by the θ range using:

$$R(\lambda, d) = \frac{\int_0^{\theta_m} f(\theta) R(\lambda, d, \theta) \sin\theta \, d\theta}{\int_0^{\theta_m} \sin\theta \, d\theta}$$

in operation 810, where f(θ) describes the angular intensity distribution of the illumination light and $\theta_m$ is the maximum value of θ obtainable from $\theta_m = \sin^{-1}(NA)$ with NA being the numerical aperture of the objective. Color variation R (d) is then calculated using:

$$R(d) = \frac{\int R(\lambda, d) I(\lambda) d\lambda}{\int I(\lambda) d\lambda}$$

in operation 812. The integrals are carried out over the wavelength range of the illumination light. A contrast [(R (d)$_{max}$ −R(d)$_{min}$)/R(d)$_{avg}$] in the predefined thickness range is then calculated in operation 814. The results of this procedure 800 are the illumination spectrum I(λ) and the color variation R(d) in operation 816. Of course operations 808 through 814 may then be repeated for adjusted heights, widths, and center wavelengths of spectrum peaks to minimize (or enhance) color variation in the predefined thickness range (e.g., in operation 818).

Figure 9:
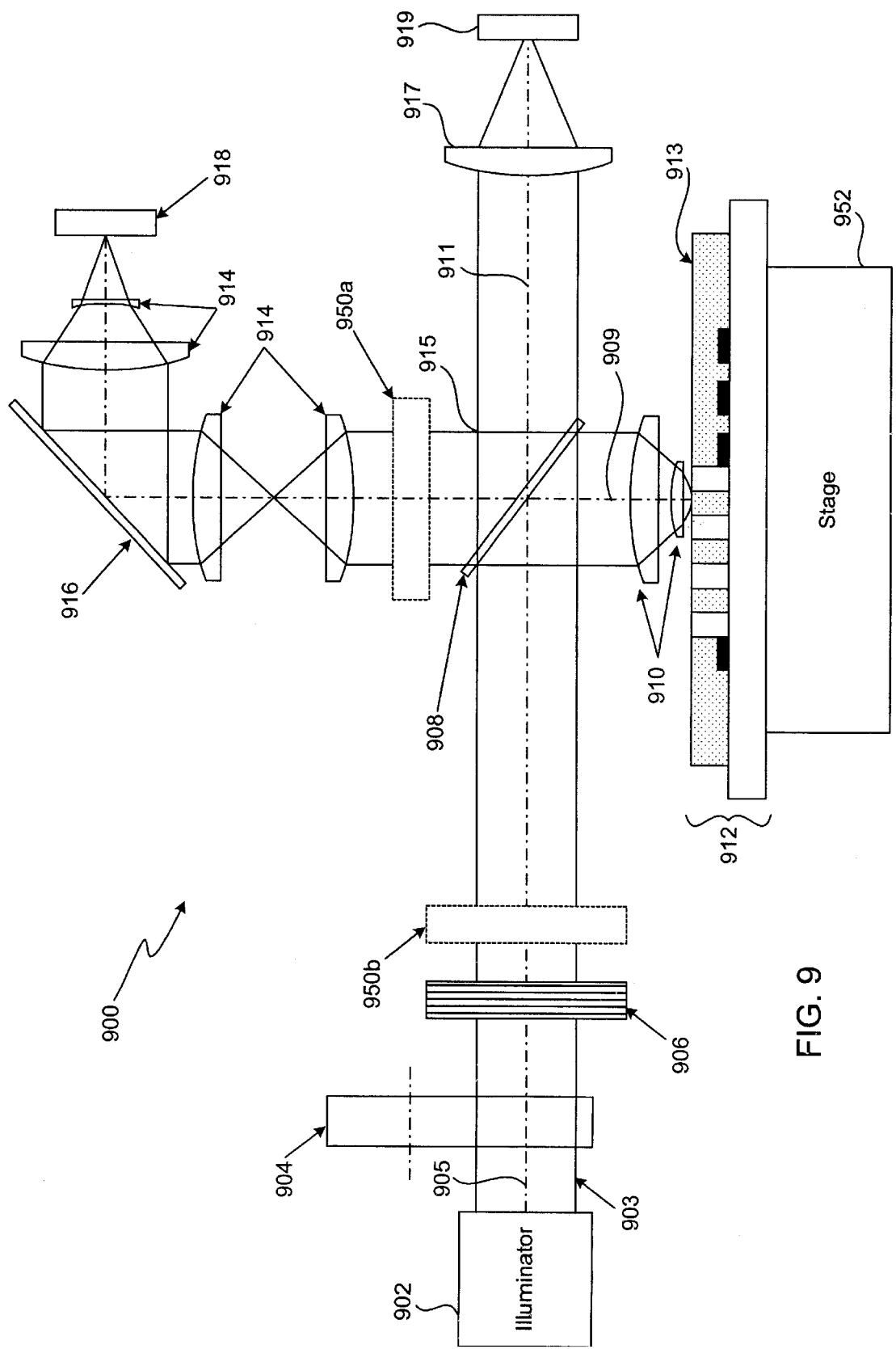
FIG. 9 is a detailed block diagram of an optical assembly that implements the optimized spectrum in accordance with one embodiment of the present invention.

FIG. 9 is a detailed block diagram of an inspection system 900 that implements the optimized spectrum in accordance with one embodiment of the present invention. For clarity, the general functions of the inspection system are described first and the optimizing functions are described further below. As shown, the system 900 includes a light source 902. The light source 902 is arranged for emitting a light beam 903 along a first path 905. The light beam 903 emitted by the light source 902, first passes through a filter wheel 904, which carriers several filters for selecting the operating wavelength ranges of the incident beam.

The light beam 903 then passes through an adjustable attenuator that is configurable to adjust the light intensity. The light beam 903 then continues on its path until it reaches a beam splitter 908. The beam splitter 908 is arranged to divide the beam 903 into paths 909 and 911. Path 909 is used to distribute a first light portion of the beams to the substrate 912 and path 911 is used to distribute a second light portion of the beams to a light level sensor 919. In most embodiments, 50% of the light is distributed to the substrate 912 along path 909 and 50% of the light is distributed to the light level sensor 919 along path 911. It should be understood, however, that the percentage ratios may vary according to the specific design of each optical inspection system. A reference collection lens 917 is arranged to collect and direct the second portion of the beam 911 onto light level sensor 919. As should be appreciated, the light level sensor 919 is arranged to measure the intensity of the light. Although not shown in FIG. 9, the light level sensor 919 is generally coupled to an electronic subsystem such as the electronic subsystem 19 of FIG. 1 such that the data collected by the imaging device can be transferred to the control system for analysis. Light level sensors 919 and their associated optics are generally well known in the art and for the sake of brevity will not be discussed in detail.

The beam 909 continuing on a path towards the surface 913 passes through objectives 910, which is arranged for focussing the beam 909 onto the surface 913 of the substrate 912. As the beam 909 intersects the surface 913 of the substrate 912, reflected light beam 915 is generated. The reflected light beam 915 reflects off the surface 913 of the substrate 912.

The reflected light beam 915 after reflecting off of the substrate 912 is collected and focused by the lenses 914, which then directs the beam 92 towards a beam splitter mirror 916. The mirror 916 directs the reflected beam 915 through lenses 914 to imaging device 918. As should be appreciated, the imaging device 918 is arranged for measuring the intensity of the reflected light. Although not shown in FIG. 9, the imaging device 918 is generally coupled to an electronic subsystem such as the electronic subsystem 19 of FIG. 1 such that the data collected by the imaging device can be transferred to the control system for analysis.

The system 900 also includes a stage 952 that can be moved laterally (in x and y directions) to allow different parts of the wafer to be viewed and inspected. The stage 952 may also be moved vertically (in z direction) for focusing.

The above described optimized spectrum may be implemented in any suitable optical inspection system. The system of FIG. 9 is merely an example and is not meant to limit the scope of the invention. In general terms, a spectrum controller 950 for controlling a spectrum of the illumination beam so that color variation of the image is controlled is added to or integrated within the inspection system in any suitable position. The resulting spectrum includes the previously determined peak wavelengths. The peaks have associated heights with a generally apodized distribution and are selected to compensate for a wavelength dependence of color variation. The peaks also have associated widths that are selected to control color variation.

In a specific implementation, the spectrum controller 950 is a filter in an optical path of the optical illumination beam. For example, the filter (950*b*) is inserted or insertably configured in an optical path of the illumination beam between the light source 902 and the sample 912. In another embodiment, the filter (950*a*) is positionable or positioned in an optical path of the reflected illumination beam between the sample 912 and an imaging device (918) of the inspection system. In yet another embodiment, the filter is integrated within one of the optics elements of the system. For example, any component of the optics may be altered to work as a filter, such as objective lens 910 or 914, filters on the filter wheel 904, mirror 916, other lenses (not shown), or beam splitter 908. The filter may also be integrated into the imaging device (918) input window.

The filter may take any suitable form for generating the optimized spectrum from an existing spectrum. By way of examples, the filter is an interference spectrum filter or a spatial light modulator combined with a wavelength dispersion device. The filter may be reflective or transmissive. In general terms, a filter is formed by putting a coating composed of a stack of specially designed thin films on a transparent material to reduce light intensity as a function of wavelength precisely by the predetermined amount over the working wavelength range. Accordingly, such a coating may be put on any existing optical component of the inspection system or designed as a separate component. Customized filters are available from Barr Associates of Westford, Mass.

In one implementation of the inspection system, the light source 902 is configured to generate a plurality of laser or narrow band beams, and the spectrum controller (e.g., 950b) is configured to combine the laser or narrow band beams and adjust an intensity level of each of the plurality of beams so as to substantially produce the above described optimized spectrum.

In another specific implementation of the inspection system, the light source 902 is configured to generate a laser or narrow band beam, and the spectrum controller (950b) is a Raman scattering material combined with an spectral intensity control mechanism positioned or positionable to generated a spectrum to thereby substantially mimic the above described optimized spectrum.

There are a multiplicity of inspection modes that can be facilitated by the aforementioned inspection system 900. By way of example, representative inspection modes including, reflected, transmitted and simultaneous reflected and transmitted modes, may be found in U.S. Pat. No. 5,563,702, which is herein incorporated by reference. It should be understood, however, that these modes are not a limitation and that other suitable modes may be used.

Although the foregoing invention has been described in some detail for purposes of clarity of understanding, it will be apparent that certain changes and modifications may be practiced within the scope of the appended claims. In an alternative design approach for the spectrum controller, one can evenly pick certain wavelengths (e.g. 5, 10, or 100 of them) in the illumination spectrum and then randomly change the light intensity at these wavelengths and calculate the color variation after each change. This process can be done on a computer and repeated by a large number of times until minimum (or maximum) color variation is obtained. This is a computation intensive approach and may not always converge to a optimal solution. Therefore, the described embodiments should be taken as illustrative and not restrictive, and the invention should not be limited to the details given herein but should be defined by the following claims and their full scope of equivalents.

What is claimed is:

1. A method of designing an optical spectrum of an illumination light beam within an optical inspection system, the method comprising:

determining a set of conditions for inspecting a film on a sample by directing an illumination light beam at the sample, where at least a portion of the illumination light beam is reflected off the sample and used to generate an image of at least a portion of the film on the sample, wherein the determined set of conditions affect color variation in the image; and determining a plurality of peak wavelength values for the optical spectrum of the illumination light beam so as to control color variation in the image of the film portion, the determination of the peak wavelengths being based on the determined set of conditions and a selected thickness of the film, the determined peak wavelengths being wavelengths within the spectrum that have a maximum intensity value as compared to neighboring wavelengths and the determined peak wavelengths being between a wavelength range of a light source of the illumination beam.

2. A method as recited in claim 1, wherein the color variation in the image is suppressed.

3. A method as recited in claim 1, wherein the color variation in the image is increased so that pattern contrast is enhanced.

4. A method as recited in claim 1, wherein the conditions include a wavelength range, a material type of the sample, an objective numerical aperture of the inspection system, and a detected spectral signal response of the inspection system.

5. A method as recited in claim 4, wherein the peak wavelengths are determined by the following equation (1):

$$\lambda_q = \frac{4nd_0 \int_0^{\theta_{fm}} f(\theta_f)\cos\theta_f \sin\theta_f \, d\theta_f}{q \int_0^{\theta_{fm}} \sin\theta_f \, d\theta_f} \quad (1)$$

wherein $d_0$ is the selected film thickness, n is the index of refraction for the film, q is an integer such that $\lambda_{min} < \lambda_q < \lambda_{max}$ with $\lambda_{min}$ and $\lambda_{max}$ being the minimum wavelength and maximum wavelength, respectively, obtainable from the inspection system's illumination source, and $\theta_f$ is the angle of refraction inside the film, the maximum value of $\theta_f$, denoted by $\theta_{fm}$ is obtainable from the objective numerical aperture (NA) of the inspection system using $\theta_{fm}=\sin^{-1}(NA/n)$ and the function $f(\theta_f)$ describes the angular intensity distribution of the illumination light in the film.

6. The method as recited in claim 4, wherein when an illumination light intensity is angularly uniform within the numerical aperture (NA) of the objective, then the peak wavelengths are determined by the following equation (2):

$$\lambda_q = \frac{2d_0(NA)^2}{qn\left[1 - \sqrt{1 - \left(\frac{NA}{n}\right)^2}\right]}. \quad (2)$$

7. A method as recited in claim 1, further comprising determining a width and a height associated with each determined peak wavelength.

8. A method as recited in claim 7, wherein the heights associated with the peak wavelengths are determined through apodization.

9. A method as recited in claim 8, wherein the heights associated with the peak wavelengths are further determined through applying a correction factor to each height to compensate for wavelength dependence of color variation.

10. A method as recited in claim 9, wherein the widths associated with the peak wavelengths are determined by:

selecting values for the widths;

simulating color variation values as a function of film thickness on the sample based on the values of the widths; and changing the values of the widths until the simulated color variation is less than a predetermined percentage value or minimized for the selected film thickness.

11. A method as recited in claim 9, wherein the widths associated with the peak wavelengths are determined by:

selecting values for the widths;

simulating color variation values as a function of film thickness on the sample based on the values of the widths; and changing the values of the widths until the contrast between two selected values of film thickness or two selected materials is greater than a predetermined values or is maximized.

12. A method as recited in claim 10, configuring an optical inspection system to construct an illumination spectrum having the determined peak wavelengths and determined widths and lengths associated with each determined peak wavelength.

13. A method as recited in claim 12, wherein configuring the optical inspection system is accomplished by forming a filter in an optical path of the optical illumination beam.

14. A method as recited in claim 13, wherein the filter is inserted between a source for the optical illumination beam and the sample.

15. A method as recited in claim 13, wherein the filter is inserted between the sample and an imaging device of the inspection system.

16. A method as recited in claim 13, wherein forming a filter is accomplished by modifying a component of the optical inspection system to serve as a filter for the optical illumination beam before or after at least a portion of the beam reflects off the sample.

17. A method as recited in claim 13, wherein the filter is an interference spectrum filter or a spatial light modulator combined with a wavelength dispersion device.

18. A method as recited in claim 12, wherein configuring the optical inspection system is accomplished by combining outputs from a plurality of lasers or narrow band light sources and adjusting the output intensity levels from the plurality of light sources so as to mimic an illumination spectrum having the determined peak wavelengths and determined heights associated with each determined peak wavelength.

19. A method as recited in claim 12, wherein configuring the optical inspection system is accomplished by passing a laser through a Raman scattering material combined with a spectral intensity control mechanism positioned or positionable to generated a spectrum to thereby mimic an illumination spectrum having the determined peak wavelengths and determined heights associated with each determined peak wavelength.

20. An inspection system for analyzing a sample, the system comprising:
   a light source for generating an illumination light beam;
   a first optics arrangement for directing the illumination beam to a film on a sample;
   a second optics arrangement for receiving a portion of the illumination beam that reflected off the sample to thereby generate an image of the film;
   a spectrum controller for controlling a spectrum of the illumination beam so that color variation of the image is controlled, wherein the controlled spectrum includes a plurality of peak wavelengths selected to control color variation for a particular thickness value of the film and a particular configuration of the inspection system, the determined peak wavelengths being wavelengths within the spectrum that have a maximum intensity value as compared to neighboring wavelengths and the peak wavelengths being between a wavelength range of a light source of the illumination beam.

21. An inspection system as recited in claim 20, wherein the spectrum controller is operable to control the color variation in the image by suppressing the color variation.

22. An inspection system as recited in claim 20, wherein the spectrum controller is operable to control the color variation by enhancing the pattern contrast in the image.

23. An inspection system as recited in claim 20, wherein the particular inspection configuration includes a wavelength range, an objective numerical aperture of the inspection system, and a configuration of the first and second optics arrangements.

24. An inspection system as recited in claim 23, wherein a plurality of heights associated with the peak wavelengths have a generally apodized distribution.

25. An inspection system as recited in claim 24, wherein the heights associated with the peak wavelengths compensate for a wavelength dependence of color variation.

26. An inspection system as recited in claim 25, wherein the spectrum controller is operable to control the color variation by selecting the widths associated with a plurality of peak wavelengths.

27. An inspection system as recited in claim 25, wherein the spectrum controller is a filter in an optical path of the optical illumination beam.

28. An inspection system as recited in claim 27, wherein the filter is positionble or positioned in an optical path of the illumination beam between the light source and the sample.

29. An inspection system as recited in claim 27, wherein the filter is positionable or positioned in an optical path of the reflected illumination beam and between the sample and an imaging device of the inspection system.

30. An inspection system as recited in claim 27, wherein the filter is integrated within the first and/or second optics arrangement.

31. An inspection system as recited in claim 27, wherein the filter is an interference spectrum filter or a spatial light modulator combined with a wavelength dispersion device.

32. An inspection system as recited in claim 25, wherein the light source is configured to generate a plurality of laser or narrow band beams and the spectrum controller is configured to combine the laser or narrow band beams and adjust an intensity level of each of the plurality of beams so as to substantially produce the controlled spectrum of the illumination beam having the plurality of peak wavelengths associated with heights that have a generally apodized distribution and compensate for a wavelength dependence of color variation to control color variation.

33. An inspection system as recited in claim 25, wherein the light source is configured to generate a laser or narrow band beam and the spectrum controller is a Raman scattering material combined with an spectral intensity control mechanism positioned or positionable to generated a spectrum to thereby substantially mimic the controlled spectrum of the illumination beam having the plurality of peak wavelengths associated with heights that have a generally apodized distribution and compensate for a wavelength dependence of color variation and to control color variation.

34. A computer system operable to design an optical spectrum of an illumination light beam within an optical inspection system, the computer system comprising:
   one or more processors;
   one or more memory, wherein at least one of the processors and memory are adapted to:
      determine a set of conditions for inspecting a film on a sample by directing an illumination light beam at the sample, where at least a portion of the illumination light beam is reflected off the sample and used to generate an image of at least a portion of the film on the sample, wherein the determined set of conditions affect color variation in the image; and
      determine a plurality of peak wavelength values for the optical spectrum of the illumination light beam so as to control color variation in the image of the film portion, the determination of the peak wavelengths being based on the determined set of conditions and a selected thickness range of the film, the determined peak wavelengths being wavelengths within the spectrum that have a maximum intensity value as compared to neighboring wavelengths and the deter mined peak wavelengths being between a wavelength range of a light source of the illumination beam.

35. A computer program product for designing an optical spectrum of an illumination light beam within an optical inspection system, the computer program product comprising:

at least one computer readable medium;

computer program instructions stored within the at least one computer readable product configured to cause a combining device to:

determine a set of conditions for inspecting a film on a sample by directing an illumination light beam at the sample, where at least a portion of the illumination light beam is reflected off the sample and used to generate an image of at least a portion of the film on the sample; and determine a plurality of peak wavelength values for the optical spectrum of the illumination light beam so as to control color variation in the image of the film portion, the determination of the peak wavelengths being based on the determined set of conditions and a selected thickness of the film, the determined peak wavelengths being wavelengths within the spectrum that have a maximum intensity value as compared to neighboring wavelengths and the determined peak wavelengths being between a wavelength range of a light source of the illumination beam.

* * * * *